US008001597B2

(12) United States Patent
Crooks

(10) Patent No.: US 8,001,597 B2
(45) Date of Patent: Aug. 16, 2011

(54) COMPREHENSIVE ONLINE FRAUD DETECTION SYSTEM AND METHOD

(75) Inventor: Theodore J. Crooks, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 1127 days.

(21) Appl. No.: 11/803,927

(22) Filed: May 15, 2007

(65) Prior Publication Data

US 2008/0005394 A1 Jan. 3, 2008

Related U.S. Application Data

(60) Provisional application No. 60/800,726, filed on May 15, 2006.

(51) Int. Cl.
*H04L 29/06* (2006.01)
(52) U.S. Cl. ............... 726/22; 713/160; 713/168; 726/3
(58) Field of Classification Search .................... 710/33; 713/150, 160, 168; 726/3, 22, 23, 26; 705/64, 705/67
See application file for complete search history.

(56) References Cited

U.S. PATENT DOCUMENTS

| 4,922,414 A | * | 5/1990 | Holloway et al. ............. 711/207 |
| 6,668,276 B1 | * | 12/2003 | Ohkado et al. ................ 709/217 |
| 2002/0133721 A1 | | 9/2002 | Adjaoute et al. |
| 2002/0138371 A1 | * | 9/2002 | Lawrence et al. .............. 705/27 |
| 2003/0135565 A1 | * | 7/2003 | Estrada ......................... 709/206 |
| 2003/0233328 A1 | * | 12/2003 | Scott et al. .................... 705/50 |
| 2005/0113110 A1 | * | 5/2005 | Joo et al. .................... 455/456.1 |

FOREIGN PATENT DOCUMENTS

WO  WO 02/45380  6/2002

* cited by examiner

*Primary Examiner* — Minh Dinh
*Assistant Examiner* — David Le
(74) *Attorney, Agent, or Firm* — Mintz Levin, Cohn, Ferris, Glovsky, and Popeo P.C.

(57) ABSTRACT

A fraud detection and protection method and system are disclosed. The method and system utilize a fraud detection and protection server to monitor online commercial transactions between a webserver and a client computer, and generate a risk assessment of a user associated with the client computer. The system and method further utilize a number of beacon servers geographically dispersed in an area. Each beacon server is configured to receive packet header information associated with the online commercial transactions, analyze the packet header information for authenticating information, and send the authenticating information to the fraud detection and protection server for the risk assessment.

18 Claims, 14 Drawing Sheets

COMPREHENSIVE ONLINE FRAUD DETECTION SYSTEM AND METHOD

CROSS REFERENCE TO RELATED APPLICATION

The present patent application claims priority under 35 U.S.C. §119 to U.S. Provisional Patent Application Ser. No. 60/800,726, filed on May 15, 2006, and entitled, "COMPREHENSIVE ONLINE FRAUD DETECTION SYSTEM AND METHOD", the entire disclosure of which is incorporated by reference herein.

BACKGROUND

This disclosure relates generally to fraud detection, and in particular a real-time, multi-factor authentication solution that uses industry-leading fraud analytics to provide maximum online fraud detection with minimal customer impact.

Online fraud is one of the biggest challenges of the Internet age. As more and more people conduct commerce online, the need to detect fraud and protect consumers from fraud is paramount. As an example, leading advisory research and consulting experts estimate that on-line transactions in retail banking alone have increased from 2.4 billion in 2001, to 11.4 billion in 2006, and are expected to reach 24.4 billion by 2010.

As one example of online fraud, a fraudster can manipulate (or emulate) the JavaScript code embedded in session pages, and thereby falsify the apparent IP address and local time of the correspondent client computer. In another example of online fraud, a fraudster arranges for beacon message-generating, embedded code to run on a proxy machine that spoofs the IP address of another machine running the main content of the session. In other words, there are two client computers: one responding to beacon servers and another communicating to the client's webserver, thus allowing a change in the transit path to the machine communicating to the webserver mid-session, thereby completing a man-in-the-middle attack.

These and other types of online fraud present a need for a robust fraud detection and prevention system.

SUMMARY

This document describes an information collection system for fraud detection and protection (FDP), generally referred to herein as an FDP system. The FDP system acquires information from an on-line banking or shopping session conducted over the Worldwide Web using Internet, HTTP, TCP/IP, IPv4 communications, and gathers information for a real-time fraud detection. In its context of use, the FDP system monitors and extends the HTTP conversation between a web server and a customer's client computer, to collect diverse, extensive and detailed information rapidly for use in real-time fraud detection.

Implementations of the FDP system include mechanisms for obtaining detailed information from IP and TCP packet headers without the necessity of connections to the communications channel used by the monitored web server, as well as mechanisms for recognizing previously seen client computers with a great deal of certainty. Implementations of the FDP system further include mechanisms for detecting changes in a session indicative of a "man-in-the-middle" attack, and mechanisms for obtaining detailed interface usage information as a basis for recognizing user behavior.

The FDP system is preferably implemented as a trained neural network combined with summarizing "profile" models of bank customer and account behavior and previously recorded data for each customer. Such profiles are updated with each on-line session, and with each banking transaction within a session and transactions in other banking channels to the same account and other accounts of the same customer. Realization of a complete fraud control system includes a suitable neural network with this information available to it and trained on past known fraudulent and genuine transactions, with the trained outcome to indicate when fraud is occurring on an account accessed by an on-line session.

In one aspect, an online fraud detection and protection system includes a fraud detection and protection server to monitor online commercial transactions between a webserver and a client computer, and generate a risk assessment of a user associated with the client computer. The system further includes one or more beacon servers geographically dispersed in an area. Each beacon server is configured to receive packet header information associated with the online commercial transactions, analyze the packet header information for authenticating information, and send the authenticating information to the fraud detection and protection server for the risk assessment.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
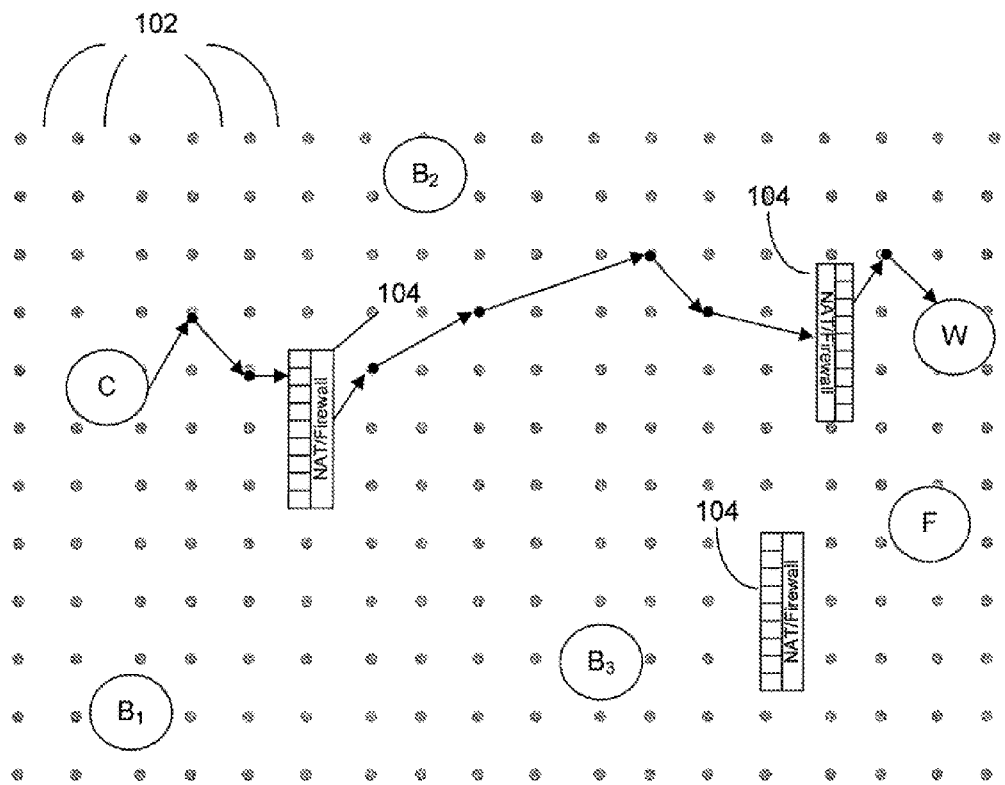
FIGS. 1-14 graphically depict the functionality and operation of an FDP system.

In this document, the term "customers" refers to the customers of an enterprise (such as the Fair Isaac Company), and the terms "client," and "clients" are businesses which are customers of such enterprise.

The FDP system uses a main server and several beacon servers. The term "beacon" can refer to a snippet of code or object downloaded in a web page that notifies other sites of the loading of a web page. Herein, the term "beacon server" means one of the several servers described. To avoid confusion, the term "beacon," by itself is not used in this paper. None of the beacon servers described herein necessarily have a local or dedicated connection to the client's webserver, and all of the beacon servers are configured to operate with conventional, encrypted Internet communications. The beacon servers are scattered around the world in locations that are distant geographically and in terms of network topology.

The following nomenclature is used in the description below and in the drawings:

W is the client's webserver(s)
C is the customer's (client) computer
F is the main FDP system server (the fraud detection machine)
B1, B2 . . . are geographically dispersed beacon servers
C-clock is the clock associated with the client computer C
The beacon servers B1, B2 . . . etc. (hereafter, generally referred to as "B" unless referred to specifically), are used for several purposes: first, they provide a point of reception of messages from client computer C that allows direct access to the low-level transport protocol so that IP and TCP packet header information can be accessed. This circumvents many potential problems with installation at bank sites where some of such information is usually unavailable, corrupted or expensive to access at the webserver. Second, because the beacon servers B1, B2 are widespread they can be used to triangulate on the location of client computer C in both space and network topology.

In preferred implementations, the client computer C is enabled to send a small HTTP request to several beacon servers B by the inclusion of a snippet of JavaScript code in the webpage served by webserver W. The FDP system preferably uses the low-level communications channel information in client computer C's response to learn about it, and correlating that information with timing at the beacon servers B and from client computer C's own clock (C-clock, which is accessible to JavaScript code running in the browser).

The JavaScript snippet also uses a common browser technique to sense user interface events such as keyboard keystrokes or mouse clicks in the browser and record them with detailed timing. This allows precise profiling of typing and mouse styles to help recognize a familiar user. By collecting detailed information on message delays and the number of hops messages make to diverse locations, it is possible to determine if geolocation information for a correspondent is accurate, and to detect when changes in the communications topology occur that maybe side effects of a man-in-the-middle attack.

The client computer C and its settings can be determined by analysis of TCP/IP packet header information formed by C's operating system. Not only is the operating system usually identifiable, but detailed version and update level recognition is often possible. Also, elements of client computer C's settings such as a network address translator (NAT), intrusion detection system (IDS), firewall and many types of proxy servers can be recognized. Such information is most important for recognition of a known system, but can also distinguish a corporate system from a consumer environment. Finally, the combination of network topology and message delay triangulation can help identify risky satellite links and dial-up connections in the communications path. For most fraud detection most of the time, the recognition of known users using previously seen correspondent computers and connections to those computers provides useful evidence of authenticity and is most often meaningful by its absence.

FIGS. 1-14 graphically depict the functionality and operation of an FDP system 100, as illustrated during the first couple pages of a web session for on-line banking. The same techniques apply to an on-line shopping session or other online commercial functions.

Taking FIG. 1 as an example, each dot in the grid of dots represents a router 102 or "hop" that transmits Internet messages hop-by-hop. Each arrowed black line represents a message as it makes its way across the Internet hopping from router to router. More specifically, each line represents the first of multiple packets in a message, since each packet travels independently, although usually along very similar paths, and are reassembled at the destination. The webserver W represents a bank's webserver for online banking. Firewalls 104 represent firewalls or network address translators, intrusion detection systems and other special routers that protect against unauthorized entry into designated parts of the Internet.

First, as shown in FIG. 1, the client computer C sends a request message to request a log-in page from webserver W. Few sites today use the standard HTTP authentication method and many use active controls of some kind for the log-in process. Regardless, the FDP system 100 handles the process similarly, requiring the client computer C's browser to support JavaScript, which is almost always a requirement for conventional commercial sites. The request message is typically in the form of an HTTP GET or POST request, a conventional browser request for a page containing log-in dialogs.

After receiving the request message for the log-in page, webserver W prepares a web page (or a control), embedded with a small amount of FDP system code such as a JavaScript snippet. The webserver W supplies a session ID somewhere in the page, but that is usually already present and if not, it is a common gateway interface (CGI) or PHP function. The FDP system code includes client-side code to cause client computer C to send a minimal HTTP request to each of a few beacon servers. Client computer C's current clock is also included in each request. Further, FDP system code can be configured to record each keystroke and mouse action in a detailed time series, and to return that record and the responses received from the several beacon servers when the current page is ended in C's browser. (The return message may be through a beacon server B or the main webserver, W depending upon convenience for integration with other bank systems.)

Figure 2:
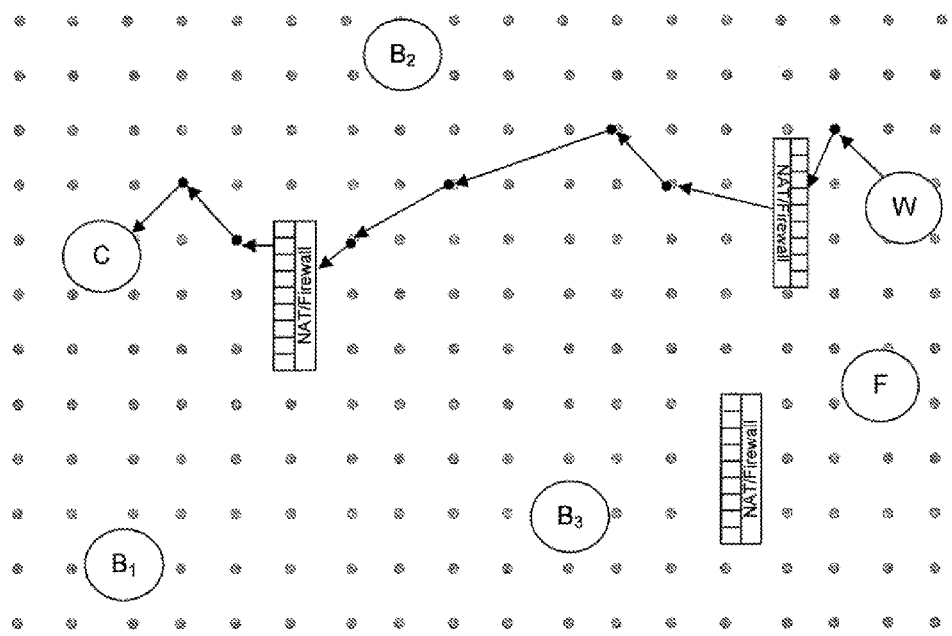
Figure 3:
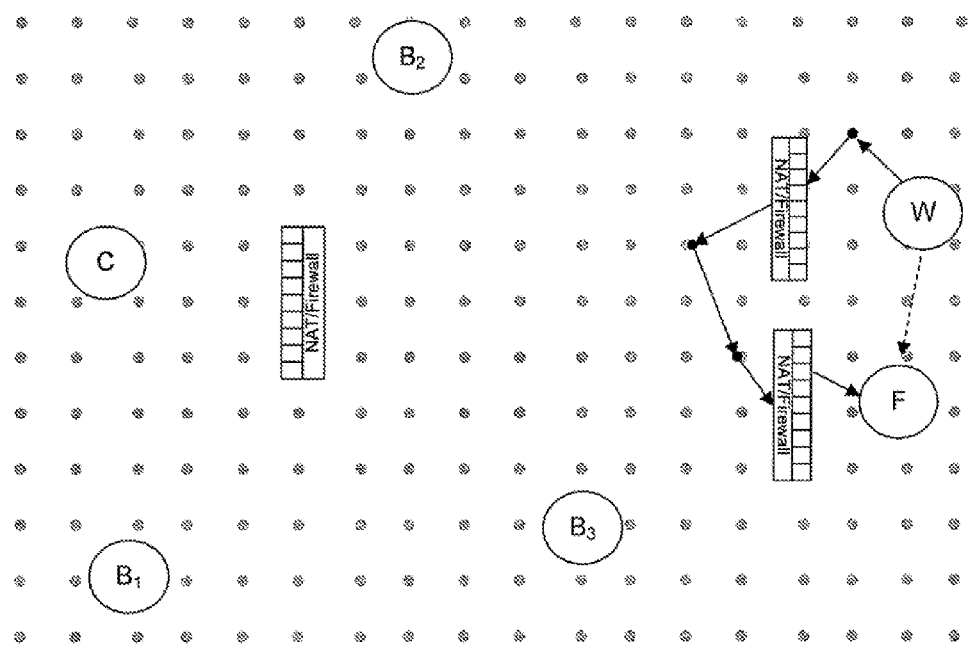

As depicted in FIG. 2, the webserver W sends the log-in page to client computer C. After providing the log-in page or control, webserver W notifies FDP system server F of the log-in request from client computer C as depicted in FIG. 3. This requires server-side code on webserver W, but can be treated as a simple HTTP GET or POST request. In high-volume locations and on-site installations, a straight socket connection kept open between the servers may be used instead of the HTTP message. The webserver W's notification message to FDP system server F includes a Session ID to use as a key for information about this session. The notification message can also include a page ID of the page in the website, and a copy of the HTTP header supplied by the client computer C in the page request message.

The Session ID includes an embedded and encrypted version of the IP address found in the HTTP header webserver W received from client computer C. This Session ID with embedded IP prevents some threats where the interface activities of client computer C are done on one computer and the generation of messages to beacon servers B is done on another. The entire notification step can be foregone at the cost of a reduction in the overall security of the FDP system 100, making it slightly more susceptible to attack: without such notice, FDP system server F will not detect sessions where beacon server requests have been suppressed (possibly legitimately). The FDP system server F would know about such silent sessions only after a request from webserver W for a risk assessment of the session (see below).

Figure 4:
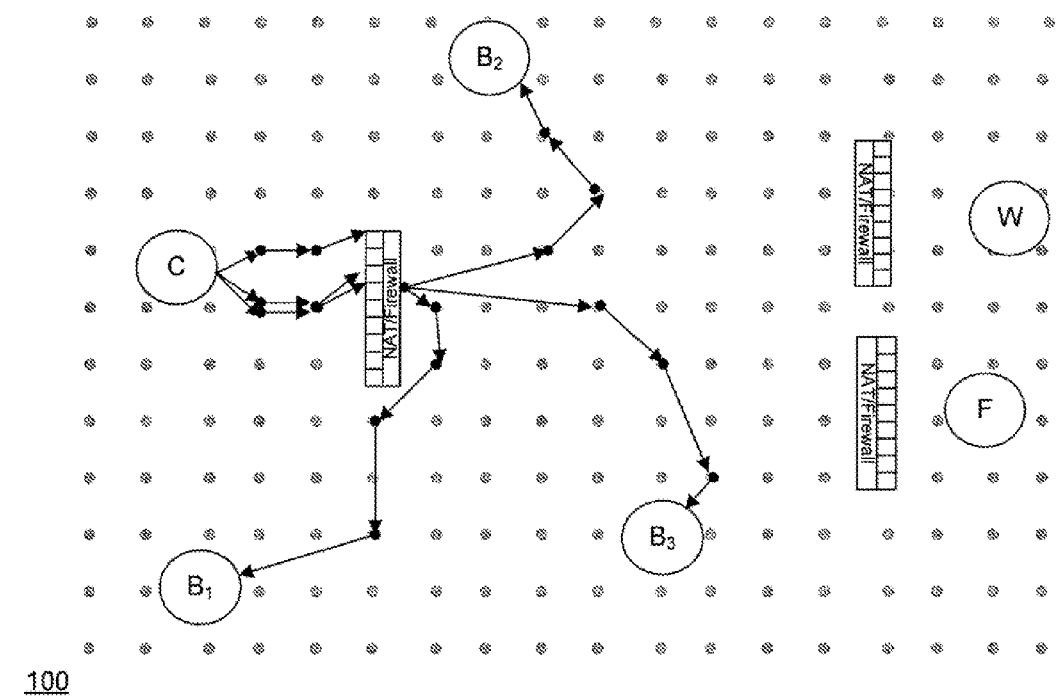

After the delivered webpage is fully loaded, client computer C executes the FDP system code embedded in the delivered webpage (typically JavaScript code) and sends HTTP post requests containing the time as known to the C-clock. These HTTP post requests travel to the several beacon servers B1, B2 and B3, as shown in FIG. 4, where the time of arrival and packet header information are recorded. Thus, each beacon server B1, B2 and B3 is given a sample of client computer C's TCP/IP stack handling, communications routing, communications delay and local clock. Each HTTP post request includes session ID, page ID, and the time of the C-clock when the request is sent. The HTTP post requests target invisible HTML frames so that beacon server B responses do not appear in the browser window at C.

Figure 5:
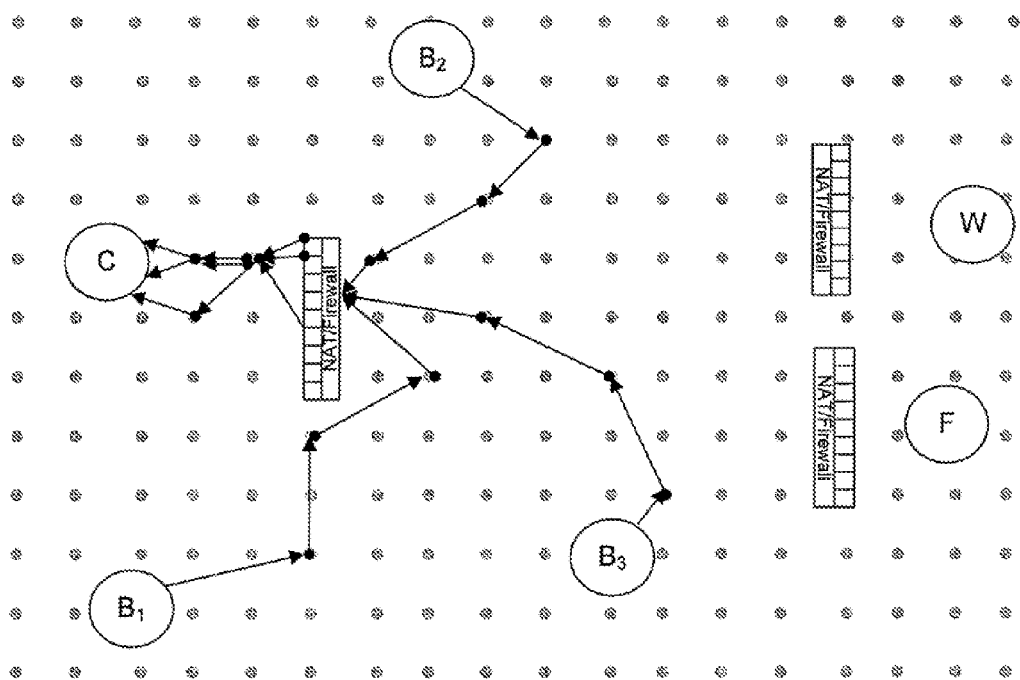

Upon receiving a message from client computer C, each beacon server B responds back to client computer C, as shown in FIG. 5. The beacon server B responses contain session ID and page ID, the time (encrypted clock) as known to the beacon server B (where care is used to ensure an accurate clock using the network time protocol (NTP) or similar method), and an encrypted beacon progressive signature. The beacon progressive signature is used in all messages from beacons. This value is calculated from the beacon's encryption key using an equation that produces a series of non-repeating values that cannot be used to determine the encryption key. With the decryption key corresponding to the encryption key, whether the message is from the signing beacon server B can be reliably tested. The FDP system code directs these responses to blank frames so they do not influence the presentation to the user at computer C.

Figure 6:
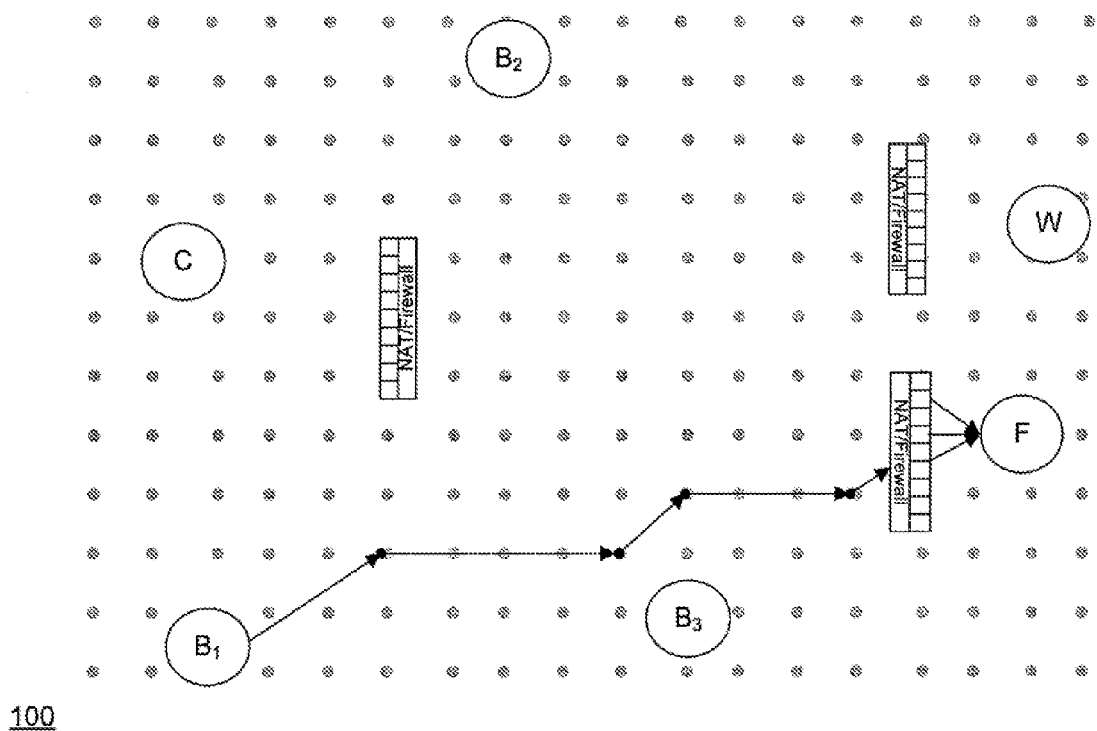

Meanwhile, each beacon server B communicates relevant information to the FDP system server F on a periodic basis, as illustrated in FIG. 6. Each beacon server B sends any new information about exchanges with any client computers C to FDP system server F. The periodic scheme spreads the load across time so not all beacon servers B ask FDP system server F for the same kind of service or acknowledgment at the same time. Also, FDP system server F records beacon server reports and alerts a human operator when a beacon server B is significantly overdue to report.

The encrypted reports periodically sent by each beacon B are preferably sent as TCP/IP messages at a fixed interval through an open session. Each report includes, without limitation: beacon ID, count of un-receipted beacon packages, and count of un-receipted end-of-page messages (see below). For each un-receipted beacon package, the report includes: session ID and page ID requesting the beacon package; C-clock value marking time of request and supplied in beacon request from client computer C; copy of the HTTP header in the beacon package C request from client computer C; copy of TCP and IP headers in the first packet of beacon package request from client computer C; beacon-clock at time each request from client computer C was received; beacon-clock at time of beacon response to client computer C; and copy of beacon package response (including progressive ID and seal).

Each un-receipted end-of-page message includes, without limitation: session ID and page ID; C-clock value supplied in end-of-page message from client computer C; copy of HTTP header in end-of-page message from client computer C; copy of TCP and IP headers in first packet of end-of-page message from client computer C; beacon-clock at time end-of-page message from client computer C was received; and beacon-clock at time of beacon response to client computer C end-of-page message. The encrypted reports also include each beacon B's progressive signature, and a seal in the form of a secure hash value of message before encryption.

Figure 7:
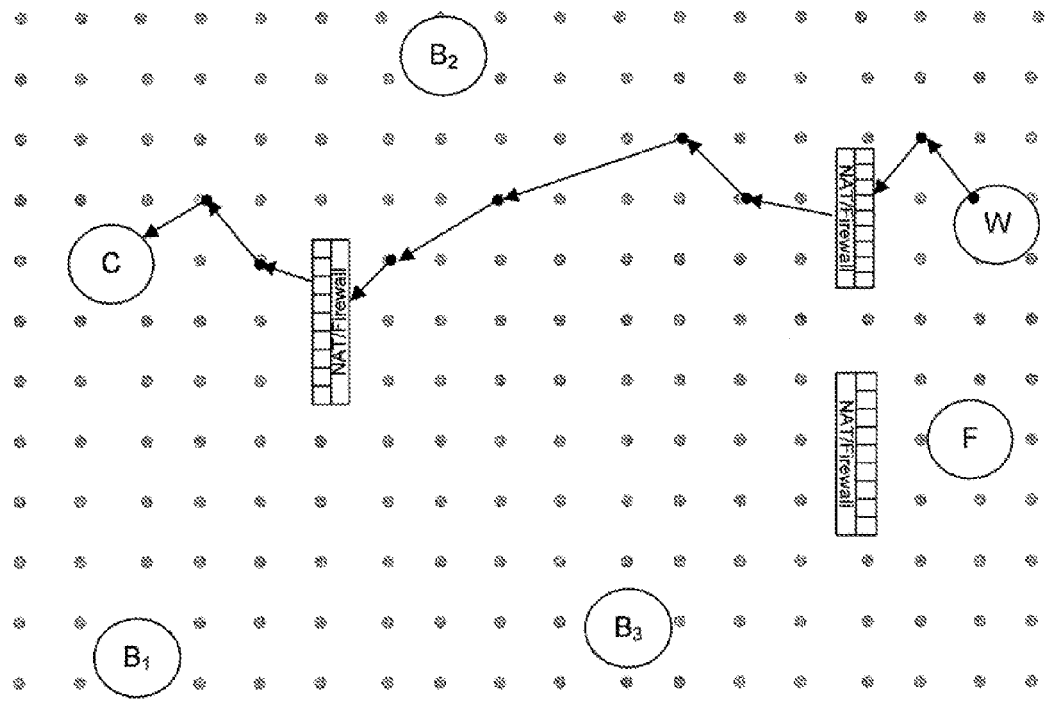

While the beacon servers B have been reporting, the user has been entering username and password or other authentication tokens and sending them from the client computer C to webserver W. The webserver W checks the authentication credentials and returns a result to the client, as illustrated in FIG. 7. From this point forward in the description, it is presumed the user's log-in attempt and response to any further challenges is successful. If not, the session would end with notation of the details known at the time of the failure.

Figure 8:
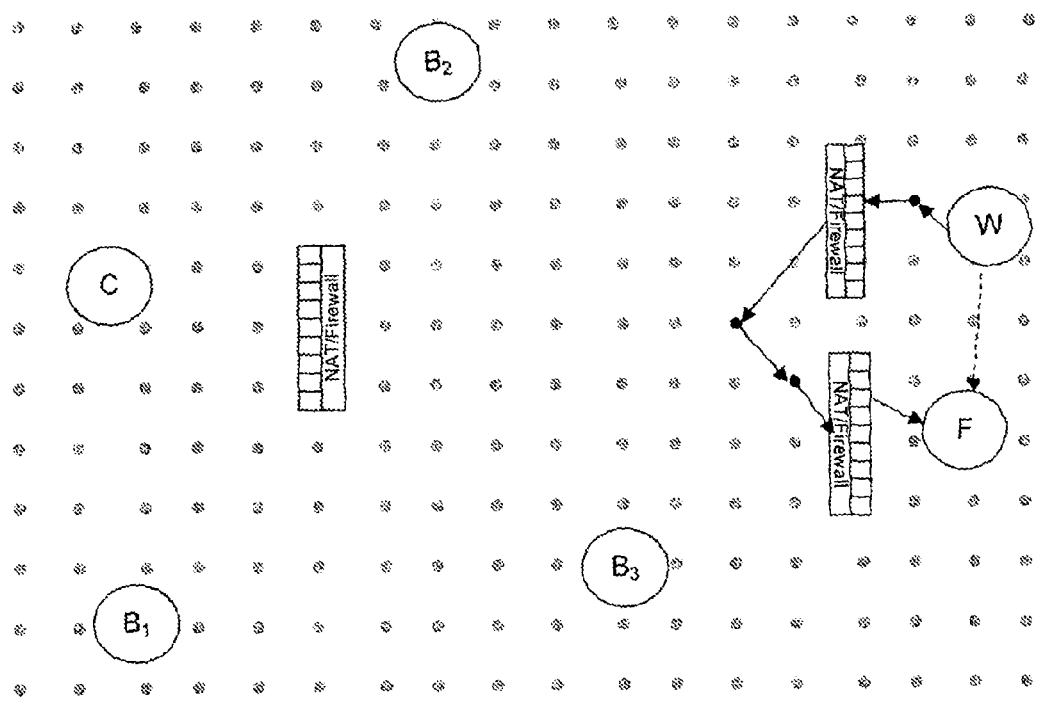

After responding to client computer C, webserver W sends a message with the results of the login to FDP system server F as illustrated in FIG. 8. In particular, the type of log-in and number of attempts required is reported so FDP system server F can take into account the rigor of the security process. This provides the flexibility to use different login types for different accounts or circumstances and take the rigor of the login into account in the fraud detection process. Assuming the log-in is successful, webserver W now has the identity of the presumptive user and is expected to include identity information in its report to FDP system server F. In some implementations, this would include a unique user ID, an enterprise-wide customer ID and a customer ID for use with a fraud clearinghouse for sharing information with other institutions. Fetching profiles and other behavioral information using these identity keys is a key to the FDP system 100.

The message sent from webserver W to FDP system server F can be through the network or direct, as indicated by the dashed arrow. In some implementations, the message contains the user ID, session ID, account ID, and enterprise ID. In other implementations, the message can also include a fraud clearinghouse customer ID that enables the FDP system server F to request profiles from other systems that monitor other channels to and from the same account, other accounts of the same customer, and other accounts of the same customer at other financial or commercial institutions. The message also reports the type of authentication used, number of attempts, etc.

Figure 9:
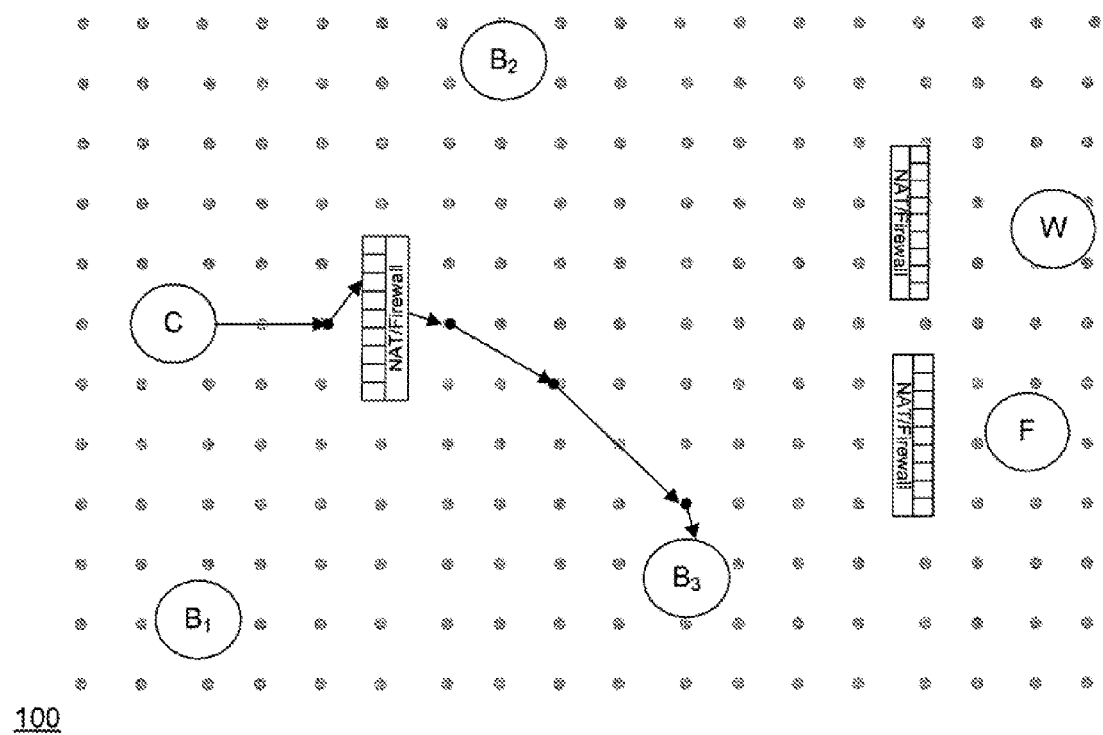

Meanwhile, the user is progressing and eventually completes the page. Upon completing the page, another module of embedded code, such as a JavaScript snippet, executes in the client computer C's browser causing a report to a single beacon server B as illustrated in FIG. 9. This report contains the information on interface events and their timing (keystrokes, clicks, etc.) accumulated during the course of the user's activity on the page, along with a reading of the internal clock on the client computer C and copies of any received beacon server responses. Copies of previously received beacon server responses are included to prevent IP spoofing, make it more difficult to separate the machine corresponding with the webserver W from the machine responding to any of the beacon servers, and to close the loop on message transit times.

In preferred implementations, the embedded code causes the client computer C to send an HTTP POST request containing the report on the interface events and their timing, as well as copies of beacon packages received. The report is transmitted to a selected beacon server (B3 in the example illustrated in FIG. 9) which will later pass it on to the FDP system server F. The end-of-page report contains a session ID (including embedded, encrypted correspondent IP address), page ID, C-clock time the report is sent, copy of each beacon server package received and the C-clock when received, and the event log string maintained by the client computer C via the code embedded in the webpage. The event log string contains the record of user interface events, with time stamps.

Figure 10:
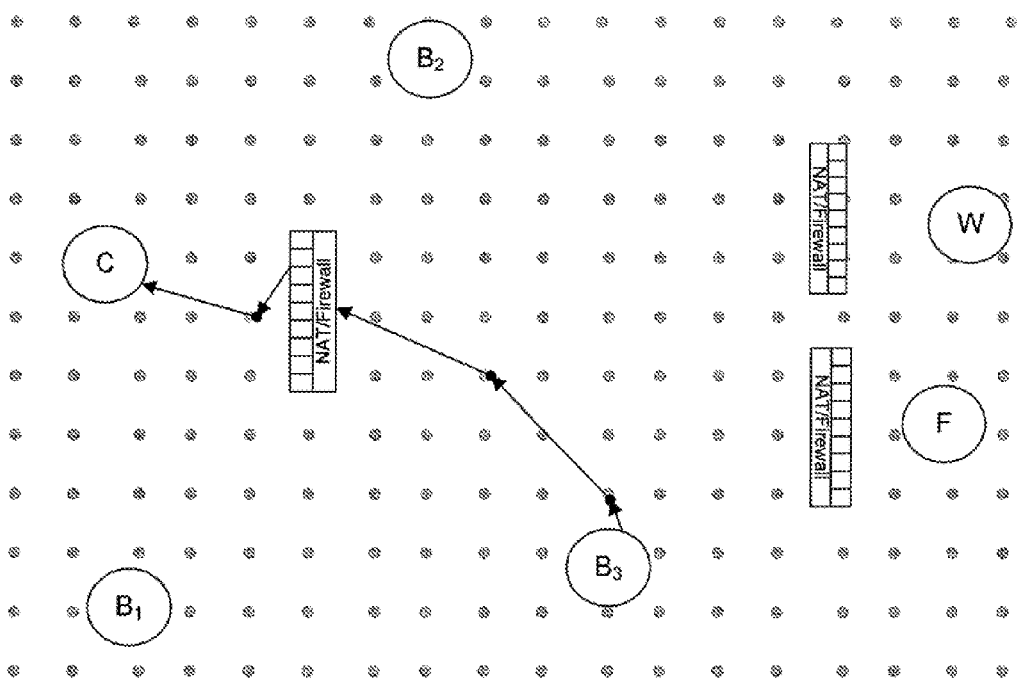

To prevent any error indication in the client computer C's browser due to an uncompleted HTTP request, the selected beacon server provides a minimal HTTP Post response, as shown in FIG. 10.

Figure 11:
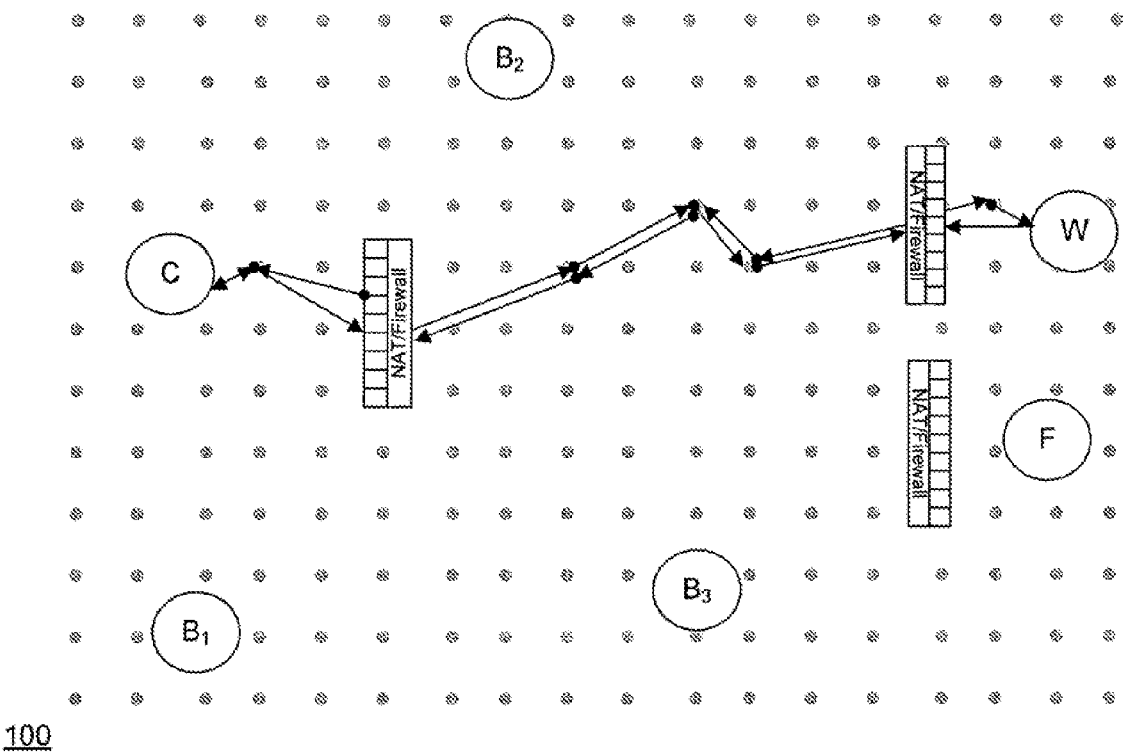
Figure 12:
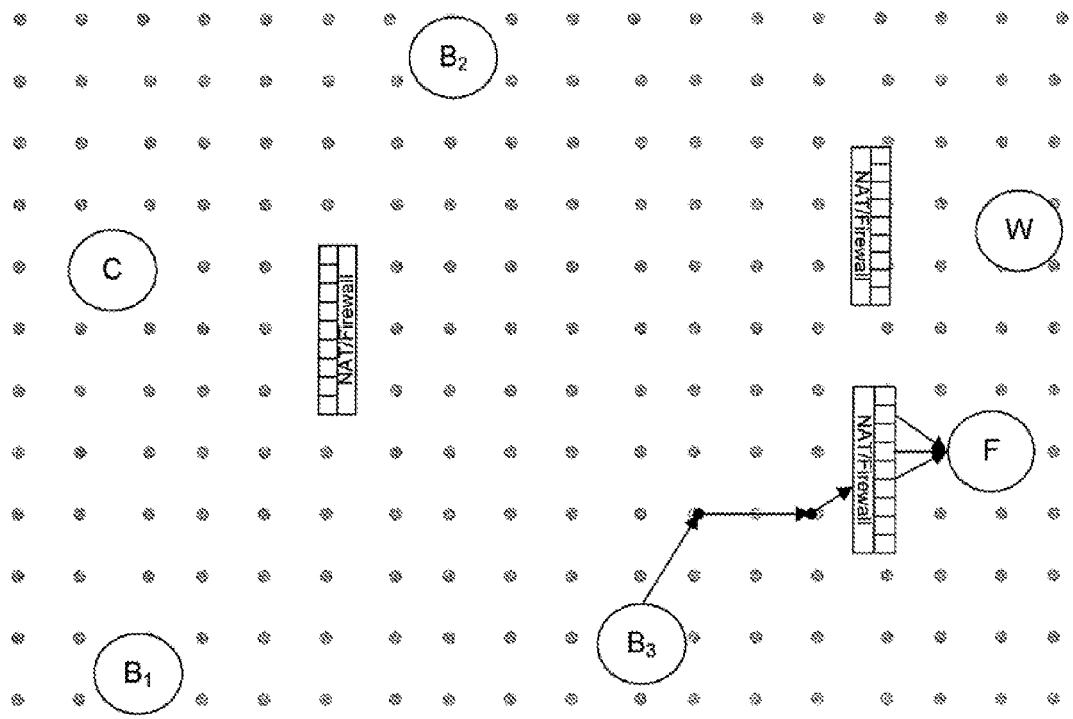

As illustrated in FIG. 11, the client computer C may go on to receive and use the next page of the session. The client computer C requests another page, the webserver W responds, and the process repeats. As the webserver W and the client computer C correspond, separately, each beacon server continues to make staggered, periodic reports to FDB system server F as shown in FIG. 12.

Periodically, as transactions and decision points require, the webserver W inquires of the FDP system server F the risk of fraud on the current session. FDP system server F responds based on the accumulated information. In some implementations, a third machine, not shown here, other than the webserver W, may make the inquiry. This third machine may be the host for other banking or order systems dealing with the transactions generated out of on-line banking or on-line merchant transactions.

Figure 13:
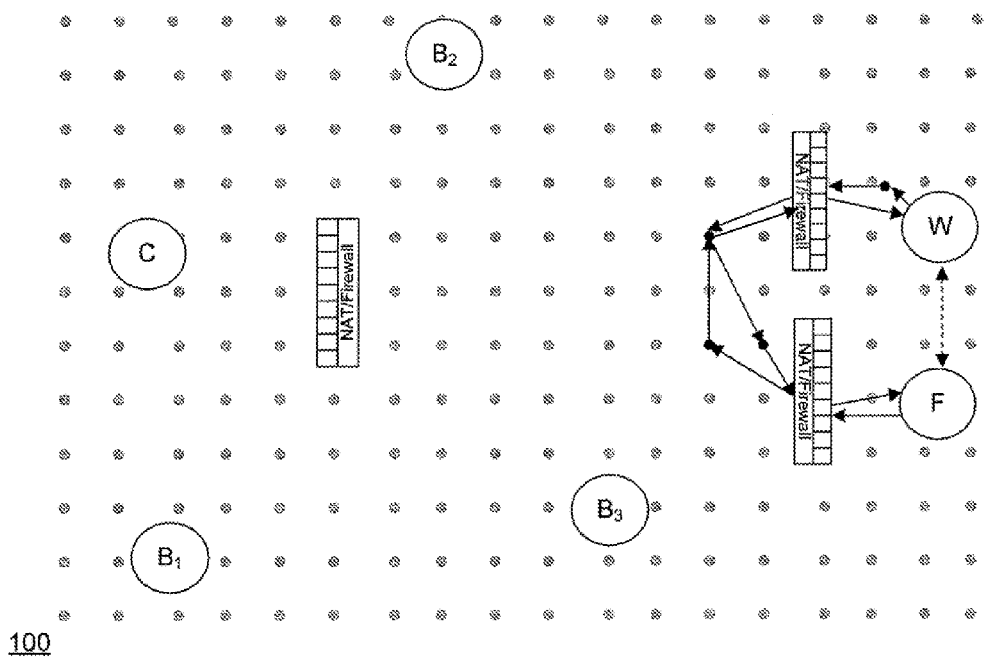

As shown in FIG. 13, the webserver W requests risk assessment from the FDP system server F, and F responds. In some implementations, the webserver W sends an HTTP POST request to FDP system server F requesting a risk assessment for a specified session ID and user ID. Alternatively, the risk assessment request may be a TCP/IP message without HTTP formatting. FDP system server F sends an HTTP POST response to webserver W including the subject session ID, user ID, and fraud risk score. In the alternative implementation, the response may be a TCP/IP message without HTTP formatting. The process can be repeated for multiple pages. Upon client computer C's browser's exit from the site, embedded code in the webpage sends a message to FDP system server F notifying it of the session end; the FDP system server F closes the accumulated session records, updates and stores profiles, and issues a final data packet and risk assessment to the webserver W.

Figure 14:
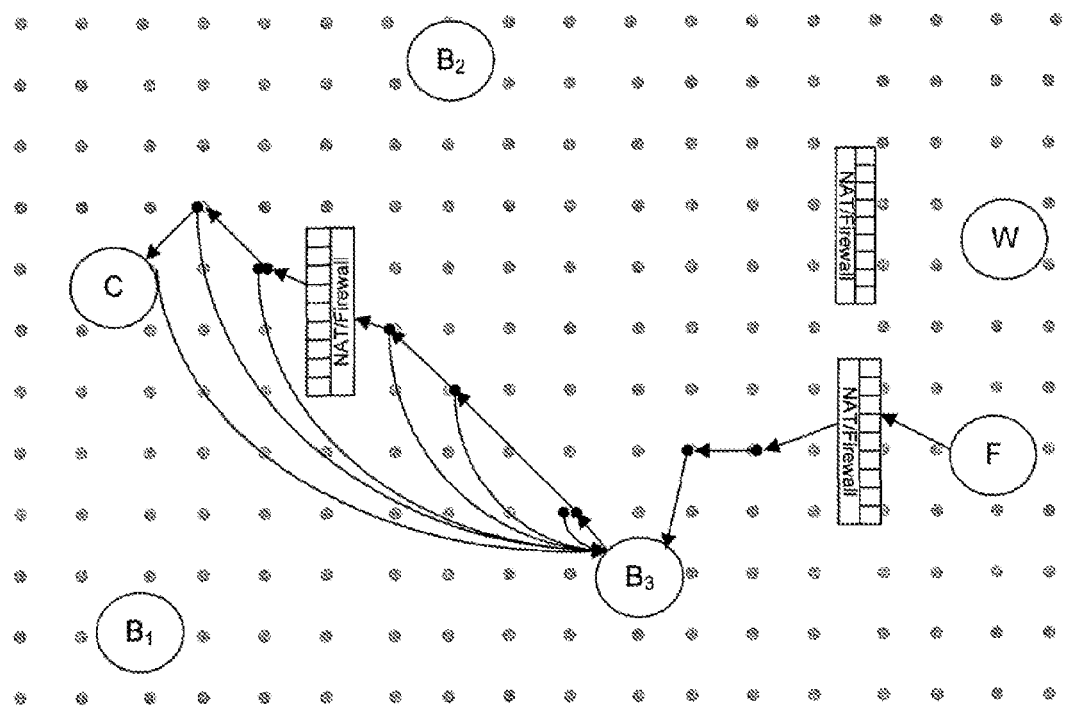

If and when needed, the FDP system can gather additional information about a correspondent machine during a session using "traceroute" techniques. Such a trace is a common Internet diagnostics tool based upon the error responses of routers operating in accord with Internet standards. A trace route gives more information on the nature and location of the routers through which a message flows as it traverses the Internet between the webserver W and the client computer C. The FDP system can employ traceroutes, pings, and other diagnostic tools to learn both the most frequent path between hosts, and the distribution of time across the hops required to traverse that path. These tools also provide information on intervening proxies, intrusion detection systems, firewalls, and other network devices, as illustrated in FIG. 14.

Accordingly, this document describes a fraud detection and protection system without having to access a user's client computer outside the resources provided by the browser operating on the client computer and intended to support remote processes.

The FDP system uses no tokens, cookies, registrations or other persistent information left behind on the client computer after completion of a monitored session (i.e. nothing outside the firewall, IDS or NAT). Only information accessible from inside the webserver W and C's browser using HTTP-embedded code is used. The FDP system described provides minimum installation complexity, minimum interference with monitored web server or site content, and no access to communications upstream from the monitored web server software.

The FDP system gathers all information available that may be useful in fraud detection. Further, the FDP system described herein is suitable for installation at the site hosting the monitored webserver W or as an ASP service, and is able to support multiple monitored web servers. Lastly, the FDP system is able to balance load across a variable number of servers as volume demands using the same techniques common in deployment of multiple computers to support an active website.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. An online fraud detection and protection system comprising:
    a fraud detection and protection server to monitor online commercial transaction between a webserver and a client computer, and generate a risk assessment of a user associated with the client computer; and
    a plurality of beacon servers geographically dispersed in an area, each beacon server configured to receive packet header information associated with the online commercial transaction, analyze the packet header information for authenticating information that authenticates the online commercial transaction, and send the authenticating information to the fraud detection and protection server for the risk assessment.

2. A system in accordance with claim 1, wherein the packet header information includes a session ID of an Internet session during which the online commercial transaction occurs.

3. A system in accordance with claim 2, wherein the packet header information includes a page ID of a webpage sent to the client computer from the webserver during the Internet session.

4. A system in accordance with claim 1, wherein the packet header information includes a local clock representing a time at the client computer.

5. A system in accordance with claim 4, wherein the client clock time is related to a request message sent from the client computer to the webserver.

6. A system in accordance with claim 1, wherein the packet header information further includes a sample of the client computer's TCP/IP stack handling, communications routing, communications delay and local clock.

7. A computer-implemented method for online fraud detection, the method comprising:
    generating an HTTP request at a client computer to each of a plurality of beacon servers within a geographical area of a webserver from which the client computer has requested an online commercial session, the HTTP request providing a local clock and IP and TCP packet header information of the client computer to each of the plurality of beacon servers; and
    determining a fraud risk associated with the client computer based on the local clock of said client computer, IP and TCP packet header information received by the plurality of beacon servers and the local time reported by each of said beacon servers, the fraud risk comprising a fraud score obtained using a neural network model.

8. A computer-implemented method in accordance with claim 7, further comprising triangulating a location of the client computer using the plurality of beacon servers.

9. A computer-implemented method in accordance with claim 8, wherein triangulating a location of the client computer further comprises triangulating the location in both space and network topology related to the network on which the client computer, plurality of beacon servers, and webserver are communicating.

10. A computer-implemented method in accordance with claim 7, further comprising generating a risk analysis based on the determined fraud risk associated with the client computer.

11. A computer-implemented method in accordance with claim 10, further comprising transmitting the risk analysis to the webserver.

12. A computer-implemented method in accordance with claim 7, wherein determining a fraud risk associated with the client computer based on the local clock, IP and TCP packet header information received by the plurality of beacon servers further comprises comparing the IP and TCP packet header information with historical data in a database.

13. An online fraud detection and protection system comprising:
    a webserver to serve one or more pages to a client computer in response to requests from the client computer for online commercial transaction;
    a fraud detection and protection server to monitor the online commercial transaction between the webserver and the client computer, and generate a risk assessment of a user associated with the client computer; and a plurality of beacon servers geographically dispersed in an area, each beacon server configured to receive packet header information associated with at least one of the pages of the online commercial transaction, analyze the packet header information for authenticating information that authenticates the online commercial transaction, and send the authenticating information to the fraud detection and protection server for the risk assessment, wherein the fraud detection and protection server spreads load across time such that two or more beacon servers send the authenticating information at different times.

14. A system in accordance with claim 13, wherein the packet header information includes a session ID of an Internet session during which the online commercial transaction occurs.

15. A system in accordance with claim 14, wherein the packet header information includes a page ID of a webpage sent to the client computer from the webserver during the Internet session.

16. A system in accordance with claim 13, wherein the packet header information includes a local clock representing a time at the client computer.

17. A system in accordance with claim 16, wherein the client clock time is related to a request message sent from the client computer to the webserver.

18. A system in accordance with claim 13, wherein the packet header information further includes a sample of the client computer's TCP/IP stack handling, communications routing, communications delay and local clock.

* * * * *